No. 748,594. PATENTED JAN. 5, 1904.
P. EYERMANN.
MACHINE FOR ROLLING TIRES.
APPLICATION FILED JUNE 13, 1903.
NO MODEL.

Witnesses: Inventor.

No. 748,594. Patented January 5, 1904.

UNITED STATES PATENT OFFICE.

PETER EYERMANN, OF PHILADELPHIA, PENNSYLVANIA, ASSIGNOR TO CHARLES T. SCHOEN, OF NEW YORK, N. Y.

MACHINE FOR ROLLING TIRES.

SPECIFICATION forming part of Letters Patent No. 748,594, dated January 5, 1904.

Application filed June 13, 1903. Serial No. 161,379. (No model.)

*To all whom it may concern:*

Be it known that I, PETER EYERMANN, a citizen of the United States, residing at Philadelphia, in the county of Philadelphia and State of Pennsylvania, have invented a certain new and useful Improvement in Machines for Rolling Tires, of which the following is a full, clear, and exact description.

The object of this invention is to provide a machine for rolling wheel-tires in which the tire is held up against the shaping-rolls by an idler-roll mounted in a pressure-exerting carrier.

The invention comprises a suitable number of shaping-rolls—say three—capable of adjustment to admit of operating upon the tire as it is reduced and a pressure-roll mounted in a carrier which is provided with positively-acting adjusting mechanism to hold the pressure-roll up against the inside of the tire as it is being formed by the action of the shaping-rolls.

Figure 1:
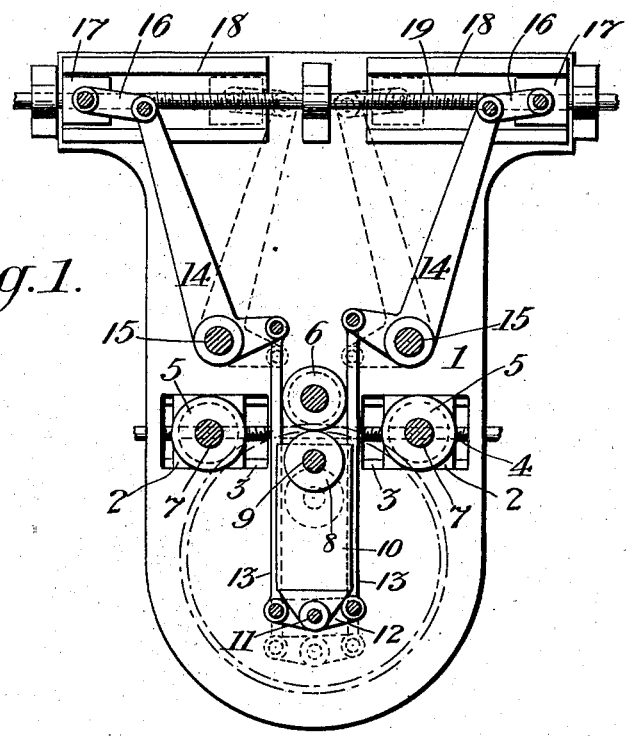
Figure 2:
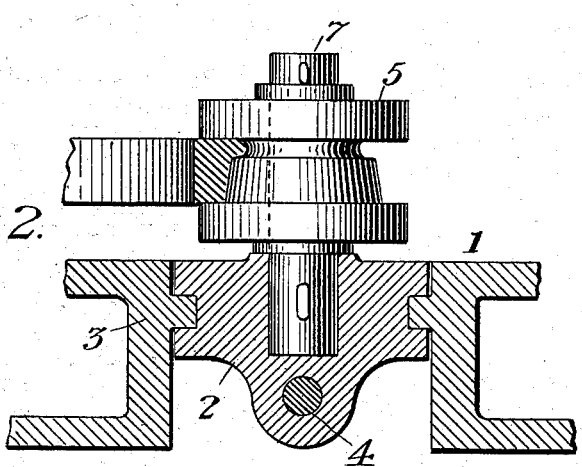

In the accompanying drawings, illustrating my invention, in the two figures of which like parts are similarly designated, Figure 1 is a top plan view of sufficient of a tire-rolling machine to show the application of my invention. Fig. 2 is a cross-sectional elevation of one of the shaping-rolls and its slide, on a larger scale.

The frame 1 may be of any approved construction to receive the mechanism. Slides 2 are arranged in suitable ways 3 in the frame, and these slides are connected to be simultaneously moved toward and from each other by a right and left hand screw 4, having bearings in the frame and actuated by any suitable means. Each slide supports a shaping-roll 5, and between these rolls is a stationary shaping-roll 6. The rolls 5 may have stud-shafts 7, upon which they revolve as idlers, and the stationary roll 6 is power-driven in any suitable way. (Not shown.) The rolls 5 and 6 occupy relatively the angles of a triangle. Opposite the rolls 6 is a pressure-roll 8 on a shaft 9, mounted in a carrier-block 10, which is pivoted at 11 to a cross-head 12, the cross-head and pivot 11 being suitably supported upon the frame 1. Opposite ends of the cross-head 12 are connected by links 13 with the shorter arms of elbow-levers 14, mounted upon shafts 15, erected upon the frame. The longer arms of said elbow-levers are separately connected by links 16 with slide-blocks 17, mounted in ways 18 on the frame and connected by a right and left hand screw 19, also supported on frame 1 and adapted to be power-driven to cause the slide-blocks 17 to approach and recede, as indicated by dotted and full lines, respectively. As the slide-blocks 17 approach the pressure-roll is moved away from the shaping-rolls, as indicated by dotted lines, to admit of the removal of a finished tire and the placing of a tire-blank in position to be rolled, and as they recede the pressure-roll is moved toward the shaping-rolls to hold the blank against the shaping-rolls to cause them to impress their profile upon the tire. The active work of shaping is effected between the pressure-roll and the stationary roll 6, and the rolls 5 serve as tire supports and guides.

The whole mechanical arrangement for setting up the pressure-roll is behind and away from the tire, thereby permitting the introduction and removal of the work by simple adjustments of the parts without having to remove any of such parts. The right and left hand screws admit of the use of auxiliary electrical machines for moving them, and, further, since each of these screws is an integer they themselves sustain the load and it is taken off their bearings, so that the machine-frame is not weakened and there is no need for heavy or reinforced bearings or means to take up end thrust.

What I claim is—

1. In a machine for rolling tires, shaping-rolls, a pressure-roll, and a carrier for said pressure-roll, combined with a right and left hand screw, slide-blocks on said screw, and connections between said slide-blocks and said carrier.

2. In a machine for rolling tires, shaping-rolls, a pressure-roll, and a carrier for said pressure-roll, combined with a right and left hand screw, slide-blocks on said screw, elbow-levers connected to said slide-blocks, and links connecting the levers and carrier.

3. In a machine for rolling tires, shaping-rolls, a pressure-roll, and a carrier for said pressure-roll, combined with a right and left hand screw, slide-blocks on said screw, elbow-levers connected to said slide-blocks, a cross-head on the carrier, and links connecting the elbow-levers and cross-head.

In testimony whereof I have hereunto set my hand this 12th day of June, A. D. 1903.

PETER EYERMANN.

Witnesses:
 THOMAS W. GILL,
 J. C. MCDONOUGH